United States Patent
Solgaard et al.

(10) Patent No.: US 7,118,347 B2
(45) Date of Patent: Oct. 10, 2006

(54) METHOD FOR ACTIVATING AN ELECTRIC MOTOR AND A METERING PUMP BY SUPPLYING PREDETERMINED PULSE INTERVALS TO SUPPLY PREDETERMINED FLUID QUANTITIES

(75) Inventors: Kurt Solgaard, Virum (DK); Bo Kragelund, Skanderborg (DK)

(73) Assignee: Grundfos A/S, (DK)

( * ) Notice: Subject to any disclaimer, the term of this patent is extended or adjusted under 35 U.S.C. 154(b) by 269 days.

(21) Appl. No.: 10/332,644

(22) PCT Filed: Jul. 11, 2001

(86) PCT No.: PCT/IB01/01767

§ 371 (c)(1),
(2), (4) Date: Aug. 11, 2003

(87) PCT Pub. No.: WO02/04811

PCT Pub. Date: Jan. 17, 2002

(65) Prior Publication Data

US 2004/0013532 A1 Jan. 22, 2004

(30) Foreign Application Priority Data

Jul. 12, 2000 (DE) .............................. 100 33 994

(51) Int. Cl.
*F04B 49/00* (2006.01)

(52) U.S. Cl. .................... 417/12; 417/43; 417/44.1; 417/44.11; 417/53; 318/811; 318/819

(58) Field of Classification Search ................ 417/12, 417/43, 44.1, 44.11, 53; 318/811, 819, 929
See application file for complete search history.

(56) References Cited

U.S. PATENT DOCUMENTS

| | | | | | |
|---|---|---|---|---|---|
| 3,498,228 | A | * | 3/1970 | Blumle et al. | 222/644 |
| 4,124,146 | A | * | 11/1978 | Sealfon | 222/641 |
| 4,137,913 | A | * | 2/1979 | Georgi | 604/67 |
| 4,326,837 | A | | 4/1982 | Gilson et al. | |
| 4,396,385 | A | * | 8/1983 | Kelly et al. | 604/152 |
| 4,435,173 | A | * | 3/1984 | Siposs et al. | 604/155 |
| 4,624,625 | A | | 11/1986 | Schrenker | |
| 4,767,279 | A | * | 8/1988 | Dourdeville et al. | 417/18 |
| 4,976,590 | A | * | 12/1990 | Baldwin | 417/53 |
| 5,269,659 | A | * | 12/1993 | Hampton et al. | 417/12 |

FOREIGN PATENT DOCUMENTS

DE 19623537 12/1997

* cited by examiner

*Primary Examiner*—Tae Jun Kim
*Assistant Examiner*—Ryan Gillan
(74) *Attorney, Agent, or Firm*—Jacox Meckstroth & Jenkins

(57) ABSTRACT

The methods serves for activating an electric motor of a metering pump with which the fluid quantity ($V_{nom}$) to be delivered is set by an external impulse trigger, wherein a predetermined delivery quantity ($V_{nom}$) is allocated to each impulse (t). The control detects the temporal interval ($\Delta t$) of the two last-received impulses and activates the electric motor such that the fluid quantity to be delivered, taking the previously evaluated interval as a basis, is distributed over the subsequent impulse interval.

2 Claims, 2 Drawing Sheets

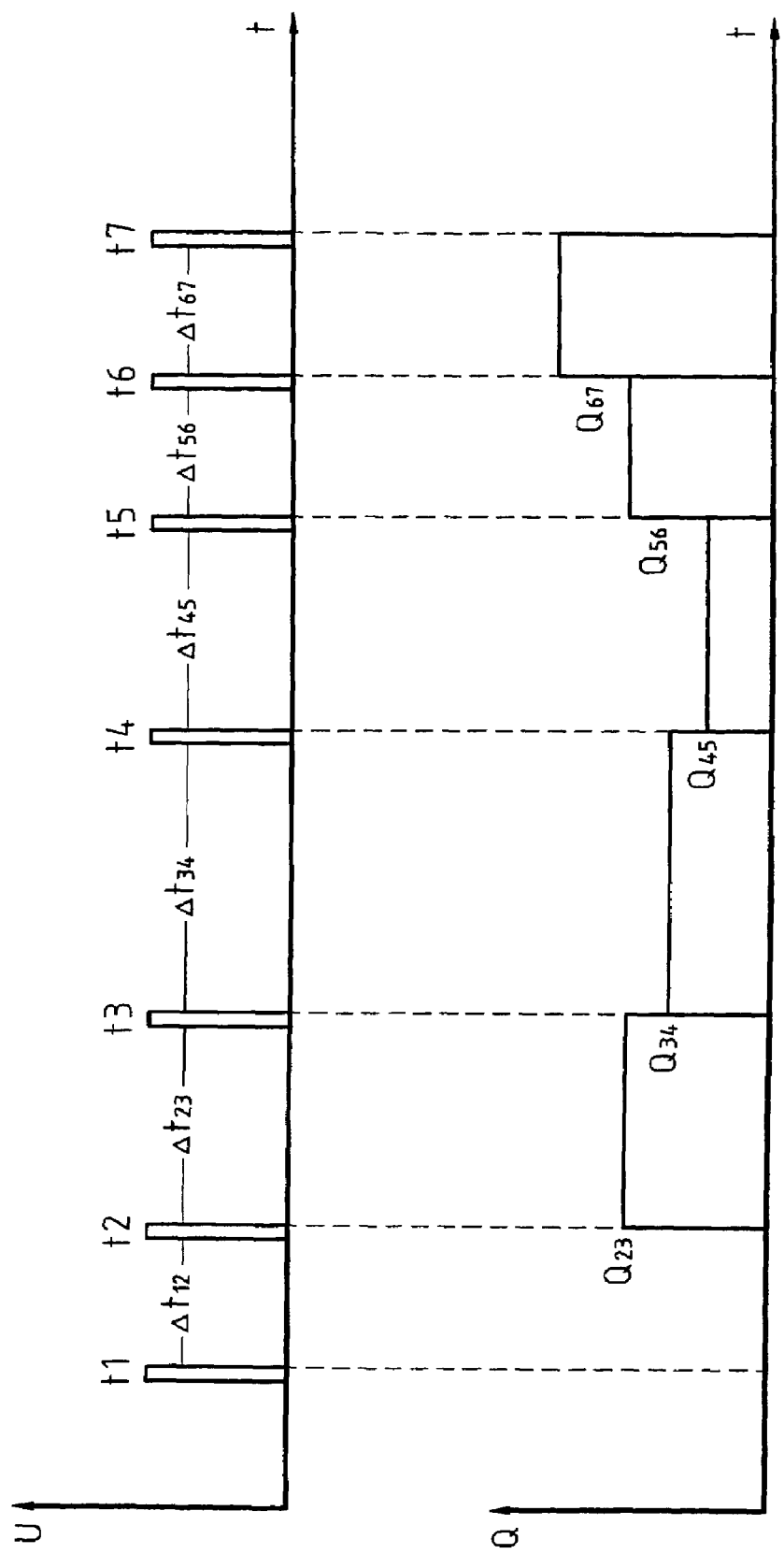

METHOD FOR ACTIVATING AN ELECTRIC MOTOR AND A METERING PUMP BY SUPPLYING PREDETERMINED PULSE INTERVALS TO SUPPLY PREDETERMINED FLUID QUANTITIES

BACKGROUND OF THE INVENTION

The invention relates to a method for activating an electric motor of a metering pump.

Metering pumps functioning according to the displacement principle, thus those with a diaphragm or piston pump, are either operated electromagnetically or by way of a motor. With electromagnetically operated metering pumps the delivery quantity is usually set by mechanical stroke adjustment on the one hand and by frequency change on the other hand. In order to achieve as accurate as possible metering (admixing) of the fluid into a changeable delivery flow (main delivery flow), such pumps usually have an electrical connection to which a clock generator may be connected which always emits an impulse when a certain delivery quantity of the main delivery flow has been delivered, whereupon the metering pump executes one or more working strokes whose delivery stroke is mechanically matched to the metering quantity to be dispensed per impulse. In spite of this matching of the delivery flows to be mixed, irregular mixing ratios may occur depending on the stroke adjustment and the fluid quantity to be delivered, specifically if, for example, in a short time the fluid to be metered is to be delivered into the main flow and the next impulse is only effected after a long period of time.

Besides metering pumps with an electromagnetic drive constructed with quite a simple design, there are also known those with an electromotoric drive, for example, from DE 196 23 537 A1. Such metering pumps are much more complicated with regard to design, but permit a more exact and uniform control of the delivery quantity. Usually they function without stroke adjustment. A metering pump of this construction type is, for example, known from the type LEW A LAB K3/K5 of LEWA Herbert Ott GmbH & Co. in Leonberg. Although this pump comprises an interface for the external metering flow control, here however the activation is effected via an analog signal, which is complicated in signal processing and further processing, and is also prone to malfunctioning. The metering delivery quantity here is controlled in dependence on an electrical current.

BRIEF SUMMARY OF THE INVENTION

Against this state of the art it is the object of the present invention to design an electromotorically driven metering pump such that with an external impulse activation it delivers according to a predefined course as exactly as possible.

In one aspect, this invention comprises a method for activating an electric motor of a metering pump, with which the fluid quantity to be delivered is predefined by way of an external impulse trigger, wherein a predetermined delivery quantity is allocated to each impulse, characterized in that the temporal interval of at least two impulses is detected and the electrical motor is activated such that the fluid quantity to be delivered, taking the previously evaluated interval as a basis, is distributed over a subsequent impulse interval according to a predefined course.

The basic concept of the present invention is to distribute the quantity to be delivered according to a predefined course over the time interval formed between two or more impulses, and specifically in a manner such that, where possible there is always present a certain delivery quantity. Usefully, at the same time, the temporal interval of two successive impulses is determined and then the drive of the electric motor, for example a stepper motor or a direct current or alternating current motor equipped with suitable sensorics for position detection, is activated such that, for example, there is effected as uniform as possible distribution of the fluid quantity to be delivered in the impulse interval subsequent to this or in a subsequent impulse interval sequence. Within the context of the present invention as uniform as possible is to be understood for example in that with a stepwise operation the steps are distributed over the impulse interval with the same temporal interval. It is to be understood that a completely uniform distribution may possibly be upset by one or more required return strokes of the pump, even if, as already belongs to the state of the art, the motor during the return stroke is activated at a higher speed than during the delivery stroke.

If the temporal intervals between the successive impulses become shorter, this may lead to the fact that the delivered and metered fluid quantity is smaller that the actually desired quantity. In order to avoid this the invention envisages determining the missed quantity resulting after the activation of two or more successive impulse intervals and correcting this in a later, preferably in the subsequent impulse interval. Such a correction may be effected in a comparatively more complicated manner by determining the actual metering delivery flow by way of external sensorics, but is advantageously determined taking the theoretical metering delivery flow resulting on account of the activation as a basis, since then no external sensorics are required and this may be determined by way of the electrical values which in any case are present internally. Since electromotorically operated metering pumps due to their design operate accurately in comparison to the initially described electromagnetically operated ones, as a rule one may do away with external sensorics without having to accept the risk of serious disadvantages.

A particular advantage of the impulse control according to the invention is the ability to do away with the stroke adjustment of the pump body known with pump membranes since this leads to inaccuracies and demands a mechanical intervention which makes the remote control of the pump difficult.

In particular on admixing a fluid into a changing main delivery flow it is desirable where possible not to let corrections take place at all, but to adapt the metering delivery flow as quickly as possible to the changing main delivery flow. This may be effected in that with the distribution of the fluid quantity to be delivered one does not only take into account the interval between two or several preceding impulses and distribute this over a following impulse interval resulting theoretically there from, but that with this also the change in the impulse intervals is determined and taken into account when calculating the distribution, i.e. a certain control algorithm is effected which achieves as early as possible adaptation to the changing conditions.

In particular, with metering procedures with which although on the one hand it is a question of as uniform as possible supply to a main delivery flow and on the other hand of the totally added quantity. i.e. a concentration to be set, as is for example required on admixing chlorine into swimming pool water, it is not only necessary to pay attention to a uniform mixture ratio but also to exclude the addition of errors which may possibly arise due to control inaccuracies or other sources of errors. For this the method according to the invention envisages detecting the number of impulses, i.e. the nominal delivery quantity or a corresponding characteristic variable and comparing this to the metering delivery quantity which results at least theoretically on account of the activation of the electric motor, or to a corresponding characteristic variable, and with differences envisages subsequently compensating these accordingly. Such a long-term control may for example detect the impulses over hours or days in order once per hour or once a day, where appropriate to carry out a supplementary correction which may not be fulfilled by a quick control which adapts the delivery flow of the metering pump to the changing main delivery flow.

Irrespective of this long-term control it is basically desirable to carry out the correction of the detected missed quantity directly after detection in order to ensure as quick as possible control. This is particularly desirable if the metering pump is applied for the continuous admixing with which a filling or packaging is effected directly after the admixing, so that later correction no longer have any influence on the already filled or packaged product.

In order to ensure that also at the beginning of the metering procedure there is already effected a uniform metering over the whole impulse interval, it is useful to initiate the activation of the pump motor not until after the receipt of two impulses. The missed quantity caused by the method because of this may be compensated by the previously described overriding correction control.

These and other objects and advantages of the invention will be apparent from the following description, the accompanying drawings, and the appended claims.

BRIEF DESCRIPTION OF THE DRAWINGS

The invention is hereinafter described in more detail by way of one embodiment example. There are shown in:

FIG. 2: a second embodiment example in a representation according to FIG. 1,

DETAILED DESCRIPTION OF THE INVENTION

Figure 1:
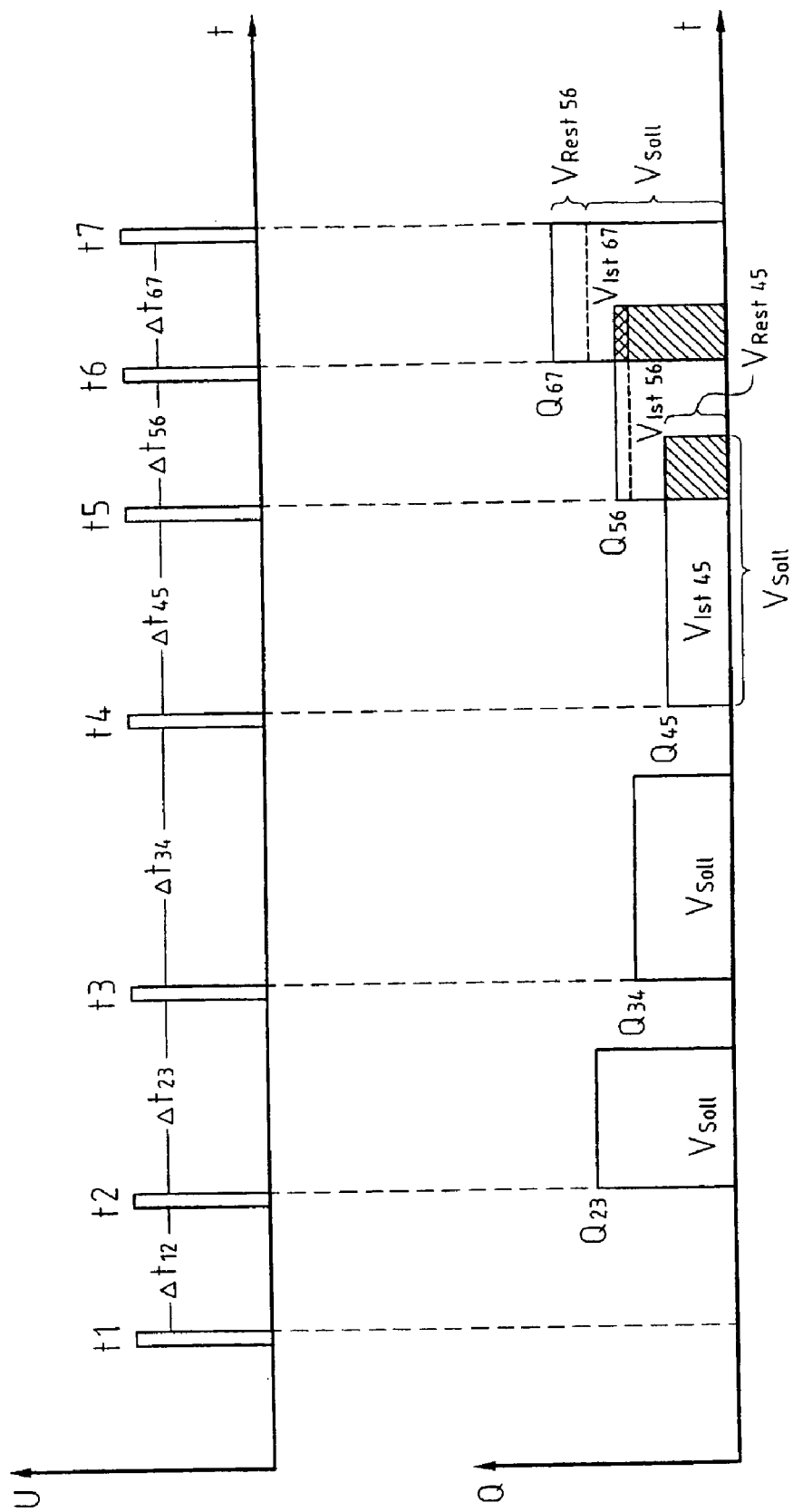
FIG. 1: the dependency of the pulse sequence on the delivery quantity of a first embodiment example.

In the drawings on the upper time axis, there is represented a sequence of electrical impulses $t_1$ to $t_7$, as for example are emitted by a clock generator, wherein each impulse $t_1$ to $t_7$ stands for a certain volume of a main delivery flow to which a suitable quantity of a metering delivery flow is to be admixed by way of the metering pump. On the lower time axis, there is shown in each case the metering delivery flow controlled by the metering pump in dependence on the external impulses.

In order to achieve as uniform as possible metering of the metering delivery flow into the main flow, the metering delivery flow is set by way of the control of the metering pump such that the metering delivery quantity to be mixed into the main flow is distributed as uniformly as possible over the whole interval $\Delta t$ formed between two successive impulses. In order to firstly detect the temporal interval $\Delta t$, it is necessary before the beginning of the metering procedure to wait for two electrical impulses $t_1$, and $t_2$ and to determine the time $\Delta t_{12}$ lying between these. Then the pump is activated according to the metering delivery quantity to be admixed per impulse such that the volume $V_{nom}$ to be delivered per impulse is distributed over a time beginning at $t_2$, which corresponds to $\Delta t_{12}$, so that taking this time interval $\Delta t_{12}$ as a basis there results a delivery flow $Q_{23}$ which has reached the preset volume $V_{nom}$ after a delivery time of $\Delta t_{12}$. Since in the present embodiment example the interval of the impulses $t_1$ to $t_4$ increases, with this control, with an increasing interval up to $t_4$ in each case a stoppage of delivery arises for a short time, if specifically the volume $V_{nom}$ has already been reached, but the subsequent impulse however has not been received.

If the control obtains the impulse $t_3$, it determines the temporal interval $\Delta t_{23}$ to the impulse $t_2$ and now distributes the quantity $V_{nom}$ to be delivered over this time interval $\Delta t_{23}$, thus reduces the delivery flow $Q_{34}$ accordingly. The metering delivery flow $Q_{34}$ results in that one divides the nominal delivery volume $V_{nom}$ by the last-determined time interval $\Delta t_{23}$.

If the intervals of the impulses do not become larger, but smaller, as this is represented by way of the impulses $t_4$ to $t_6$, there arises the problem that a new impulse, for example $t_5$ is received if the time interval for which the delivery flow $Q_{45}$ has been calculated in order to reach the volume $V_{nom}$ is not yet completed. With the control according to the first embodiment example (FIG. 1) the pump is activated such that on receipt of a new impulse (here $t_5$ for the first time) the previous delivery is stopped and for the now newly beginning delivery interval $\Delta t_{56}$ one fixes a delivery flow $Q_{56}$ which is calculated such that within a time period of $\Delta t_{45}$ there results a volume $V_{nom}$ plus a volume $V_{rest}$. The volume $V_{rest}$ results from the volume $V_{nom}$ minus the volume $V_{ist}$ which is actually delivered in the preceding interval. Thus for the delivery interval $\Delta t_{45}$ there results a volume $V_{rest}$ which results from the delivery flow $Q_{45}$ multiplied by the difference of $\Delta t_{34}$ and $\Delta t_{45}$. This volume which is delivered in the time interval $\Delta t_{45}$ and which is too low thus is added to $V_{nom}$ on calculation of the delivery flow volume $Q_{56}$.

Since the time interval $\Delta t_{56}$ again is smaller than the preceding $\Delta t_{45}$, the delivery flow $Q_{56}$ is interrupted after receipt of the impulse $t_6$ and then a metering delivery flow $Q_{67}$ is produced, with which taking a delivery interval of the size order of $\Delta t_{56}$ as a basis the delivery flow has been calculated such that there results a volume which corresponds to the volume $V_{nom}$ plus the volume $V_{rest56}$ not yet delivered in the delivery interval $\Delta t_{56}$. The volume $V_{rest56}$ which has not yet been delivered at the same time is composed on the one hand of a component of the volume $V_{nom}$ which has not yet been delivered in this interval and on the other hand of the not yet delivered component of the volume $V_{rest45}$ of the further preceding interval, which can be recognised by the cross-hatching whilst the remaining rest volume is simply hatched.

The previously described control algorithm illustrates the fact that by way of the control one may react quite quickly and exactly to the impulse even with changing intervals. In practice, the fluctuations of the impulse intervals are quite low so that the comparatively complicated control represented by way of FIG. 1 is often not at all required or may be compensated by an additional overriding correction. Such an overriding correction may follow after a predefined time or after a predefined number of impulses, wherein the nominal volume to be delivered within this time corresponding to the impulse number is evaluated and compared to the actual volume resulting on account of the control, and where appropriate is corrected in the subsequent interval or in the subsequent intervals. Control errors or also control deviations may be detected over this long-term correction in order to anticipate as much as possible the adaptation to the changing impulse intervals. In practice, control errors, be they due to return strokes or other false strokes, may occur which otherwise are difficult to detect or may not be detected at all.

In most cases, however, a simplified control according to the embodiment example according to FIG. 2 would be sufficient with which the delivery flow is computed according to the previously described embodiment variant in which firstly one waits for two impulses $t_1$ and $t_2$, the time period $\Delta t_{12}$ formed between this is evaluated and the nominal volume $V_{nom}$ to be delivered per impulse is distributed over this time period $\Delta_{12}$ so that a delivery flow Q results. In contrast to the previously described embodiment variant, however, after reaching the delivery flow $V_{nom}$ the delivery procedure is not interrupted but one delivers further up to the receipt of the next impulse $t_3$ in order to ensure a continuous admixture. The delivery quantity $Q_{34}$ activated on receipt of the impulse $t_3$ results from the volume $V_{nom}$ to be delivered per impulse and the time $\Delta t_{23}$. The delivery here is also effected up to the receipt of the next impulse $t_4$.

As results from this, due to the control, with this embodiment variant with a reducing impulse sequence too much is delivered, whilst with an increasing impulse sequence too little is delivered, since in each case the preset delivery quantity is not corrected until receipt of the next impulse. Since the main delivery flow in practice is comparatively constant and the deviations fluctuate above and below to the same extent, one may achieve a comparatively exact metering with this simplified control with the advantage that one admixes continuously, thus without breaks. Here too one may provide an overriding control which for example counts the received impulses after hours or days, determines the nominal volume of the whole metering delivery flow from this and compares this to the actual metering delivery flow delivered according to the control and where appropriate corrects this. The overriding correction may advantageously be carried out after a few impulses or after carrying out one or more pump strokes. Furthermore the control has the usual safety circuits which for example ensure that the metering delivery flow is adapted given excessively large deviations in the main delivery flow, e.g. is stopped if after a predefined time one receives no further impulse.

The invention claimed is:

1. A method for activating an electric motor of a metering pump, with which a fluid quantity to be delivered is predefined by way of an external impulse trigger, wherein a predetermined delivery quantity is allocated to each impulse, characterized in that the temporal interval of at least two impulses is detected and the electrical motor is activated such that the fluid quantity to be delivered, taking a previously evaluated interval as a basis, is distributed over a substantial impulse interval according to a predefined course, and the pump motor is not activated to deliver fluid until the receipt of at least two impulses.

2. A method for activating an electric motor of a metering pump, said method comprising the steps of:
    predefining a quantity of fluid to be delivered by an external impulse trigger to the electric motor;
    allocating a predetermined delivery quantity to the external impulse;
    detecting an interval between at least two impulses;
    activating the electric motor for a period of time using said interval:
    determining a missed quantity resulting after the activation of two or more successive impulse intervals;
    correcting for said missed quantity in subsequent impulse intervals; and
    activating the pump motor to perform said correcting step only after receiving at least two impulses.

* * * * *